Patented Apr. 1, 1952

2,591,646

UNITED STATES PATENT OFFICE 2,591,646

STABILIZED READY MIXED ALUMINUM COATING COMPOSITION

William T. Walton and William Carl Spitzer, Chicago, Ill., assignors to The Sherwin-Williams Company, Cleveland, Ohio, a corporation of Ohio No Drawing. Application May 20, 1947, Serial No. 749,354

4 Claims. (Cl. 106—290)

This invention relates to a means of stabilizing a ready mixed aluminum coating composition to increase its shelf life and to eliminate the danger of gas formation within the package.

Aluminum paints and other aluminum containing fluid coating compositions are widely used because of the intrinsic physical properties of aluminum bronzes when incorporated into such compositions. Aluminum paints have been accepted as quality prime coats for wood and metals. The sealing qualities of aluminum paints have extended their use to prevent stained surfaces from bleeding through upon recoating. The durable features of aluminum as a pigment in finishes have been recognized and aluminum pigmented coatings are often specified as prime coats for exterior steel work.

The manufacture, storage and sale of ready mixed aluminum paints is old, and coating materials of this nature have been employed for protective and decorative purposes for several decades. Considerable difficulty and loss have been encountered by manufacturers of ready mixed aluminum paints, and various precautions have been observed to prevent deterioration of warehoused material due to the formation of gas and gel structures within the container.

It is well known that aluminum in its elemental state when in a pulverulent condition is quite reactive. Many manufacturers have found it necessary to distribute aluminum coating compositions in double compartment cans to keep the reactive aluminum powder isolated from the possibly reactive fluid phase until just prior to use. By this means the aluminum bronze is kept from intimate contact with the vehicle. Consumer mixing of dry dusty materials into a liquid has many disadvantages. The powder is carried easily by the air and creates a nuisance for the consumer, and the manufacturer and the public are put to the additional expense of more costly double compartment containers.

A further objection to present day ready mixed aluminum paints has been the loss of leafing quality in the prepared product. The loss of this particular quality is apparent in lowered hiding capacity per ounce of bronze, and a less pleasing, less silvery-smooth film after drying.

One of the objects of this invention is to provide new and improved stabilized aluminum paints.

A further object is to provide aluminum paint compositions stabilized against loss of leafing of the aluminum pigment upon age in the container.

Another object is to provide a new and improved method of stabilizing aluminum paints. Other objects will appear hereinafter.

In accordance with this invention it has been found that aluminum paints can be produced in large volume and prevented from gassing and consequent losses in storage and leafing qualities essentially maintained upon storage by the following simple steps. At some time prior to filling the bulk product into smaller sized containers, a substantial quantity but preferably less than 10% of plaster of Paris is added to the batch. This may be done by two methods. One is to prepare a stock addition agent by grinding plaster of Paris in the varnish normally used as a vehicle for the ready mixed aluminum powder paint to produce a stock base which can be added to the paint. Small amounts of a plaster of Paris in dry powdered form can also be added directly to the bulk batch of aluminum paint.

Good agitation is required to disperse thoroughly the powdered plaster of Paris in the batch. However, as many paint mixing tanks are equipped with a slow type agitator, there is some possibility of objectionably large agglomerates of powdered agent remaining in the product, thereby producing objectionable seediness in the applied paint film. If seediness develops upon addition of the dry agent, it is an indication that agitation is not adequate. The use of a prepared paste is to be preferred because of ease of preparation and handling, elimination of danger of seeds, and general convenience.

The use of a prepared paste of plaster of Paris base will assure trouble-free production, and the effect upon the quality of the product will not be found objectionable.

The aluminum bronze content of aluminum coating compositions may be varied over a wide range. In some cases one may wish to use as low as four or five ounces per gallon of a specific fineness and quality of aluminum bronze. In other cases, it may be desired to use as much as three pounds of a 65% aluminum bronze paste per gallon where such high pigmentation is desired. According to the recommendations of major aluminum powder producers and from general experience with similar coatings, two pounds of aluminum bronze of 65% aluminum content per gallon have been found quite generally satisfactory for all-purpose ready mixed aluminum paints. In practice, 30% of the weight of the paint composition as aluminum bronze is a maximum above which there is little reason to go. If more aluminum bronze is used the coating composition will become quite viscous and difficult to apply to surfaces, and little other advantage accrues.

Many variations are possible in the vehicle or varnish employed to combine with the aluminum bronze in the manufacture of a ready mixed composition. The varnishes of interest are usually mixtures of drying oils, resins, metallic driers and volatile solvents. A number of standard drying and semi-drying oils may be employed, including linseed, soya, perilla, fish and China wood oil. Many resins can be blended and cooked or cold cut into these oils such as the natural occurring congo, kauri, manila and pontianak. A number of artificially prepared or synthetic resins are of considerable interest and may be used as film-forming ingredients, including ester gums, oil modified phenol-formaldehyde condensation products, oil modified alkyds, indene-coumarone resins, copolymers, elastomers, and chlorinated rubbers may be used as film-forming ingredients.

The volatile solvent portion may be either an aromatic or an aliphatic compound possessing suitable solvency for the solid film-forming portion of the vehicle and having a desired evaporation rate. The type and amount of driers included may be varied within known ranges. It is preferable, however, that lead containing driers either be held at a minimum or be eliminated entirely as they may have a dulling effect upon aluminum bronzes.

In the preferred methods of preparation of the ready mixed aluminum paint the requisite quantity of bronze paste is thinned out with successive additions of from 5% to 10% of the fluid components with continuous agitation until all the fluids have been added. The method assures a smooth product, free of agglomerated pigment.

Other agents may be found to prevent gas formation in the container with age but hydrophilic forms of calcium sulfate are unique in having no inherent objectionable features. Plaster of Paris added as a paste ground in part of the vehicle in the quantities indicated has no observable effect upon the color, or the durability, of the resultant dried film. Plaster of Paris is non-pigmentary in the sense of contributing essentially no opacity to a paint vehicle and consequently no changes in the appearance of the coating after drying can be detected. The amounts necessary to eliminate gassing are minor so that for practical purposes the presence of the addition agent does not adversely affect the quality of the paint.

The amount of stabilizing agent necessary to prevent gassing has been found to bear a very close relationship to the amount of moisture present in the final paint composition. The water present may be determined by analysis of the composition after blending has been completed, or it may be determined from a summation of the moisture content of each component part, and the stabilizer added accordingly.

It has been determined experimentally that coating compositions containing aluminum bronzes may tolerate small percentages of water without gassing. While the percentage of water needed to react may vary due to the quality and quantity of bronze used in the composition, the safe tolerable percentage has been found to be near 0.05%. Under this percentage no delayed gassing was observed in retained test samples, while above this threshold value, losses of stock ready mixed aluminum paints due to gas formation were observed upon prolonged storage.

The invention will be illustrated but is not limited by the following examples:

Example I

An aluminum paint was prepared from the following ingredients:

137 lbs. 325-mesh aluminum powder paste (Varnaluminum)
38 gal. cold cut resin solution (60% Velsicol AB-11-8, 40% mineral spirits, by weight)
20 gal. 55-sec. linseed oil (Gardner-Holdt viscosity)
5 gal. 13-sec. dehydrated castor oil
27 gal. mineral spirits
1 gal. 2% cobalt naphthenate in mineral spirits In preparing this batch the vehicle used was made by cold cutting the resin with the oil and solvent. The vehicle portion may also be compounded by cutting the resins by heating them in order to save time if it is so desired. The mineral spirits and vehicle were added slowly to the aluminum powder base so as to insure a smooth product. This paint weighed approximately 8.05 pounds per gallon and there were about 103 gallons in the batch. It was found by Dean-Stark determination that 0.1% of moisture was present. Inasmuch as it has been found that the quantity of stabilizer base necessary can be predetermined on the basis of the moisture content, and that as a general rule good results can be obtained by adding about six times as much stabilizer by weight as there is water present in the batch, 0.6% by weight of the batch or 5 pounds of plaster of Paris stabilizer base was added slowly with good agitation to the 103 gallon batch. After one year of age no losses of stock samples were observed.

Example II

In a manner similar to that described in Example I, a paint was prepared from the following ingredients:

137 lbs. 325-mesh aluminum powder paste (Varnaluminum)
12⅝ gal. cold cut resin solution (60% cumar gum, 40% mineral spirits)
8⅜ gal. 13-sec. dehydrated castor oil
7 gal. xylene
59¾ gal. mineral spirits
⅜ gal. 2% cobalt naphthenate in mineral spirits This batch weighed 7.6 pounds per gallon and the total bulk was 103 gallons. A gallon sample was removed from the batch and the water content increased to 1%. One-half (½) gallon was set aside without further treatment, and the remaining half gallon of 3¾ pounds weight was further altered by the addition of 0.23 pounds of dry plaster of Paris powder with good agitation. After one year's time the sample with the 1% water was found to have blown off the cover and the plaster of Paris sample was found to be in good condition.

Example III

In a manner similar to that described in Example I, an aluminum paint was prepared from the following ingredients:

175 lbs. 325-mesh aluminum powder paste (Varnaluminum)
19 gal. 13-sec. dehydrated castor oil
12 gal. aromatic naphtha
12 gal. mineral spirits 42 gal. cold cut resin solution (60% ester gum, 40% mineral spirits)

1¼ gal. 2% cobalt naphthenate in mineral spirits

This produced 103 gallons of paint weighing 8.09 pounds per gallon.

The batch was analyzed and found to contain 0.5% of water and 4.5% or 37 pounds of a stock stabilizer base was added and stirred into the resultant paint.

The stock stabilizer base was made by mixing 650 pounds of plaster of Paris with 350 pounds of the vehicle of the paint composition in a paint mixer and passing the resulting mixture over a roller mill or other paint grinding equipment in one or more passes. The ratio of plaster of Paris to varnish vehicle may be varied to suit the milling apparatus and the convenience of the men using the stock base, but the ratio used in the preparation of the aforementioned stock stabilizer base has been found satisfactory for roller mill dispersion.

After one year no losses were experienced in this product.

*Example IV*

An aluminum paint was prepared by mixing together the following ingredients in the manner described in Example I:

171 lbs. 325-mesh aluminum powder paste (Varnaluminum)

12⅝ gal. cold cut resin solution (60% Velsicol AB-11-8, 40% mineral spirits)

4⅜ gal. 55-sec. linseed oil

59¾ gal. mineral spirits 7 gal. high solvency petroleum thinner (distillate range 155° C.–217° C.)

⅜ gal. 2% cobalt resinate in mineral spirits 4 gal. light pressed sardine oil

This batch contained 103 gallons and weighed 7.6 pounds per gallon. An analysis showed 0.08% of water and 3.75 pounds of plaster of Paris was sprinkled into the batch. No losses were discovered in the warehousing of this batch of paint after one year of standing.

*Example V*

An aluminum paint was prepared as described in Example I from the following ingredients:

175 lbs. 325-mesh aluminum powder paste (Varnaluminum)

42 gal. cold cut resin solution (375 lbs. Velsicol AB-11-8, 125 lbs. Velsicol AD-63, 41 gal. mineral spirits, 10 gal. high solvency naphtha, distillate range 350° F.–475° F.)

13 gal. 55-sec. linseed oil 6 gal. light pressed sardine oil 24 gal. mineral spirits 1⅜ gal. 2% cobalt naphthenate in mineral spirits The resultant batch contained 103 gallons and weighed 8.1 pounds per gallon. The moisture content was determined to be 0.75% of the total batch by Dean-Stark measurement. After determination of the moisture content 53 pounds of a stock stabilizer base prepared as described in Example III, but with the vehicle of the paint described in this example, was added to the batch. After a year no observable defects were apparent in the paint. Serious bulging of the cans due to gassing was apparent in control samples taken before the stabilizer base was added.

Either the stabilizer base or the dry powdered material will act equally well as a stabilizer in the ready mixed aluminum compositions. The plaster of Paris ground in the varnish base has proven to be the most advantageous way of adding the stabilizing agent in plant use.

The Velsicol resins AB-11-8 and AD-63 are catalytically polymerized hydrocarbons obtained by condensing recycle unsaturated petroleum stock obtained as a by-product in the cracking of petroleum residues in the presence of catalysts such as aluminum chloride.

In general, it may be stated that the invention is applicable to the preparation of any aluminum paint, but is especially valuable in the preparation of aluminum paints containing in excess of .025% of water, and particularly in aluminum paints having a water content within the range of from 0.05% to 1%. Even where the water content of the paint is low enough so that the paint would ordinarily be stable, it is desirable to add a stabilizer in accordance with the invention in order to insure the stability. Most aluminum paints will contain not more than about 30% of aluminum bronze powder as the pigment, and the quantity of plaster of Paris required to insure stability may be as low as 0.25%, and ordinarily will never exceed 10% by weight of the paint. As previously indicated, a quantity of plaster of Paris corresponding to about six times the amount of water present in the paint was found to be adequate for the purpose of the invention. The varnish vehicle will usually constitute at least 50% by weight of the paint.

The term plaster of Paris as used herein refers to hemihydrated calcium sulfate ($2CaSO_4 \cdot H_2O$).

Other stabilizing agents have been investigated and found objectionable for one or more reasons. Silica gel in its various forms was found of little value if the gel particles were large in particle size and to be of excessive bulk when reduced to the proper fineness in particle size to the point of satisfactory activity. Excessive bulk results in puffiness, seeding and dullness in the film. Other stabilizing agents were substituted unsuccessfully in trials. For example, magnesia was found to be sufficiently alkaline so that reaction with the aluminum occurred. Ethyl silicate was tried and found inoperative, causing a more rapid evolution of gas than when not present.

Having thus described the invention, what we claim as new and desire to secure by Letters Patent of the United States is:

1. A prepared metallic coating composition characterized by its stability over long storage periods which consists essentially of a quantity of a metallic aluminum pigment having a tendency to generate hydrogen in the presence of water, a quantity of a varnish vehicle, and a quantity of plaster of Paris, the quantity of the plaster of Paris being effective to stabilize said composition against gas formation, said quantity of plaster of Paris being within the range of 0.25% to 10% by weight of the composition.

2. A prepared metallic coating composition characterized by its stability over long storage periods which consists essentially of a quantity of aluminum metallic pigment, a quantity of an oleoresinous varnish vehicle, and a quantity of plaster of Paris, the quantity of varnish vehicle being at least 50% by weight of said composition, the quantity of the plaster of Paris being more than 0.25% but less than 10% by weight of said composition and the quantity of the metallic pigment corresponding to at least 4 ounces per gallon of the composition but not more than 30% by weight of the composition.

3. A prepared, ready for use, aluminum paint characterized by stability in its characteristics over extended periods of time which consists essentially of a quantity of an aluminum powder, a quantity of an organic water insoluble film forming liquid, a quantity of a volatile organic solvent for said liquid, and a quantity of plaster of Paris, the quantity of the film forming liquid and the volatile solvent being at least 50% by weight of the composition, the quantity of the plaster of Paris being within the range of at least 0.25% but less than 10% by weight of the composition, and the quantity of aluminum powder corresponding to at least 4 ounces per gallon of the composition but not more than 30% by weight of said composition.

4. A ready mixed aluminum bronze coating composition characterized by leafing characteristics of the metallic pigment therein and stability against loss of these characteristics and against the formation of gas over extended periods of time which consists essentially of a quantity of an aluminum bronze powder having leafing characteristics, a quantity of an oleoresinous varnish vehicle, and a quantity of plaster of Paris, the quantity of the varnish vehicle being at least 50% by weight of said composition, the quantity of the aluminum bronze powder corresponding to at least 4 ounces per gallon but not more than 30% by weight of said composition, and the quantity of the plaster of Paris being within the range of 0.25% to 10% by weight of said composition.

WILLIAM T. WALTON.
WILLIAM CARL SPITZER.

REFERENCES CITED

The following references are of record in the file of this patent:

UNITED STATES PATENTS

| Number | Name | Date |
|---|---|---|
| 451,705 | Berthing et al. | May 5, 1891 |
| 2,044,292 | Grady, Jr. | June 16, 1936 |
| 2,205,735 | Scherer, Jr. | June 25, 1940 |

OTHER REFERENCES

Uses and Applications of Chemicals and Related Materials, Gregory, vol. 1, Reinhold Pub. Co., N. Y., pg. 143, copyright 1939.